United States Patent [19]

Hedenäs et al.

[11] 4,138,231
[45] Feb. 6, 1979

[54] METHOD OF WET-CLEANING GASES CONTAINING SULFUR DIOXIDE, HALOGENS AND ARSENIC FROM PYROMETALLURGICAL TREATMENT OF SULPHIDIC MATERIALS

[75] Inventors: Bo G. V. Hedenäs, Viken; Johan E. Wiklund, Helsingborg; Thore R. H. Johansson, Helsingborg; Karl-Axel Melkersson, Helsingborg, all of Sweden

[73] Assignee: Boliden Aktiebolag, Stockholm, Sweden

[21] Appl. No.: 782,908

[22] Filed: Mar. 30, 1977

[30] Foreign Application Priority Data

Apr. 9, 1976 [SE] Sweden ................................ 7604219

[51] Int. Cl.² ............................................. B01D 19/00
[52] U.S. Cl. ........................................... 55/71; 55/72; 55/73; 423/210; 423/242; 423/531
[58] Field of Search ................. 55/71, 72, 73; 423/88, 423/153, 154, 242, 488, 531, 568, 210

[56] References Cited

U.S. PATENT DOCUMENTS

| 2,028,318 | 1/1936 | Carter | 423/242 |
| 2,416,011 | 2/1947 | Latchum, Jr. | 423/488 |
| 3,677,696 | 7/1972 | Bryk et al. | 55/72 |
| 3,899,308 | 8/1975 | Petersson | 55/73 |

FOREIGN PATENT DOCUMENTS

| 742052 | 12/1955 | United Kingdom | 423/242 |
| 780984 | 8/1957 | United Kingdom | 423/242 |

Primary Examiner—Bernard Nozick
Attorney, Agent, or Firm—Stevens, Davis, Miller & Mosher

[57] ABSTRACT

The invention comprises a method of wet-cleaning gases containing sulfur dioxide, halogens together with arsenic and/or arsenic compounds obtained in a pyrometallurgical treatment of sulfidic materials. The gases are washed in a diluted sulfuric acid circulating in a closed circuit, from which arsenic is recovered. The gases are then cooled to water condensation whereby the halogens are substantially completely taken up in said condensate and separated. The separated condensate is then discharged to a recipient after precipitation of residual arsenic and neutralization.

11 Claims, 1 Drawing Figure

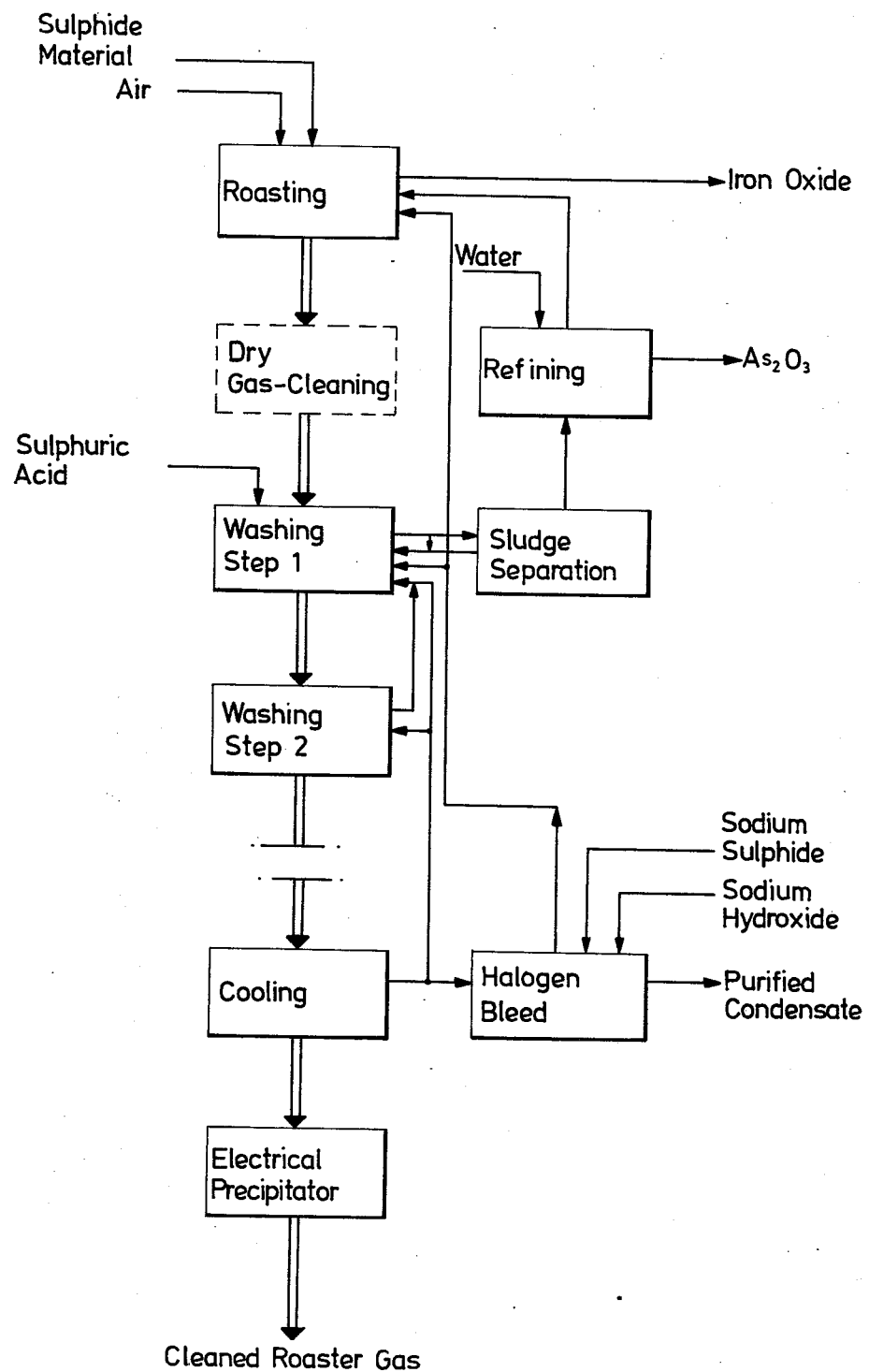

METHOD OF WET-CLEANING GASES CONTAINING SULFUR DIOXIDE, HALOGENS AND ARSENIC FROM PYROMETALLURGICAL TREATMENT OF SULPHIDIC MATERIALS

The present invention relates to a method in wet-cleaning gases containing sulfur dioxide, halogens and arsenic or arsenic compounds and obtained when pyrometallurgical treating sulphidic materials, in which method the gases are passed through a washing stage in which the gases are washed with a washing liquid of diluted sulfuric acid circulating in closed circuit and whereafter the gases are cooled. The method particularly relates to the wet-cleaning of gases which, subsequent to being subjected to a conventional dry, hot-gas cleaning process, have been substantially freed from solid precipitates or accompanying solid material, particularly when the gas, subsequent to said dry gas-cleaning stage contains halogens and arsenic. The method according to the invention enables sulfidic materials to be treated pyrometallurgically without the emission of harmful substances to either the atmosphere or to some other recipient. The sulfidic materials may comprise one or more of the minerals pyrite, pyrrhotite, chalcopyrite, chalcopyrrhotite, marcasite, chalcocite, arsenopyrite and other arsenic containing material, pentlandite and zinc blende which minerals may be contaminated with halogen ions. The sulfidic materials contain also arsenic either as arsenical mineral or as a contamination in other minerals. The pyrometallurgical treatment may be any process where a sulfide dioxide gas which also contains arsenic and halogen is obtained. Said sulfide dioxide gas is below referred to as "roaster gas".

For example, when roasting sulfide-containing minerals there is obtained a roaster gas which contains sulfur dioxide and dust, for example roasted products entrained with the gas, and certain gases formed from impurities present in said minerals. From the aspect of environmental care and protection, arsenic, mercury and selenium compounds represent the most serious hazards. The sulfur dioxide must be recovered in the form of pure sulfur dioxide, sulfur trioxide, oleum or sulfuric acid and in all instances the impurities in the roaster gases must be removed therefrom before the final product is recovered.

Halogens, primarily halogens in the form of chlorides and fluorides, are often present in sulfidic minerals and also in those minor quantities of water which are introduced into the gas-cleaning system. If these impurities are permitted to accumulate in the roaster-gas wet-cleaning system, the final halogen content of the circulating washing solutions will be of such magnitude as to cause corrosion of the metallic and ceramic components of the process apparatus. Halogens are also liable to accompany the roaster gas, which may be pure in other respects, through the gas-cleaning systems and subsequently cause a decrease in the activity of the vanadium catalyst normally used, as well as damaging the catalyst in other respect, said catalyst being used in the oxidation of sulfur dioxide, for example, for the manufacture of sulfuric acid. Thus, the halogens must be removed from said gas-cleaning system before critical halogen-concentrations are reached.

Roaster gas can be readily freed from arsenic and other impurities by washing the gas in suitable apparatus. In these apparatus, the impurities are transferred from the gas to washing liquids which generally comprise diluted sulfuric acid. The contaminated washing acids have hitherto, e.g. in known roasting plants, been either released to a recipient or have been deposited, subsequent to possible alkalizing the acids. In both cases damage is caused to the environment and, in addition, sulfuric acid is lost.

It is known how to eliminate both mercury and arsenic by washing roaster gas in sulfuric acid solutions of varying concentrations. The elimination of mercury by washing roaster gas in a strong sulfuric acid solution is described, for example, in Swedish Specification No. 339 417 and in the German Specification No. 2 132 231. The elimination of arsenic from roaster gas by treating the gases with sulfuric acid solutions containing solid arsenic trioxide is described, for example, in Swedish Pat. Specifications Nos. 306 304 and 338 036. A serious disadvantage encountered with all these known methods in which sulfuric acid is utilized to clean roaster gas, resides in the fact that the sulfuric acid concentrations at which the gas is most effectively purified with respect to mercury and arsenic, which concentrations are also normally used in practical operations, i.e. a sulfuric acid content of more than 20–25% by weight, gaseous halogenides, for example in the form of heavy metal halogenides and hydrogen halogenide will pass the washing stage and contaminate the end product or the atmosphere. On the other hand, if weaker sulfuric acid solutions are used, the halogenide content is taken up in the solutions, which results in serious environmental problems when the washing solutions are deposited, or results in the aforementioned corrosion problems which occur when the solutions are circulated in the gas cleaning system and accumulate halogens.

The object of the present invention is to provide a method in which the aforementioned disadvantages are eliminated and in which the emission of harmful substances is completely avoided and in which valuable constituents can be selectively recovered from the gas in a form which enables them to be further treated.

The invention comprises a method of wet-cleaning gases containing sulfur dioxide, halogens, and at least one volatilized substance selected from the group arsenic and arsenic compounds, emanating from pyrometallurgical treatment of sulfidic materials, in which method the gases are washed with diluted sulfuric acid circulating in a closed circuit and subsequently cooled, wherein substantially the whole amount of said at least one volatilized substance, is taken up and solidified in said diluted acid and selectively separated from a part-stream of said diluted sulfuric acid in said closed circuit, the part-stream being recycled to the washing step and pyrometallurgical treatment, the washed gases, being freed from any entrained liquid sulfuric acid and having a water content which permits a substantial water condensation to be obtained during the subsequent cooling are cooled, whereby halogen ions are substantially completely taken up in the formed condensate, the condensate is separated from the gas, and at least a part of the condensate formed by said cooling of the gases is treated with a precipitating agent so as to precipitate any residual amounts of arsenic compounds whereafter the precipitate is separated from the remaining condensate which is neutralized and discharged to a recipient.

As will readily be understood, it must be ensured that the amount of water present in the gas is of such magnitude that, with the cooling capacity available, sufficient water is condensed out to take up all, or substantially all the halogens present. The method according to the invention involves treating the roaster gas in at least three cleaning stages under carefully controlled conditions and in a manner such that certain impurities can be recovered in a useable form in one cleaning stage, while halogens are taken out in the form of an aqueous solution, which is pure in other respects, in one of the later stages.

The method provides main products in the form of purified roaster gases suitable for preparing sulfur dioxide, sulfur trioxide, oleum or sulfuric acid. In the first cleaning stage, the washing stage, the temperature of the gas is lowered from 300°–450° C. to beneath 100° C. by adiabatically evaporating water from the sulfuric acid solution. Also removed in this step is a major portion of the content of gaseous impurities of the gas together with dust remaining after the dry-gas cleaning process. The minor quantities of sulfur trioxide unavoidably formed in conjunction with for example the roasting process in multiple hearth furnace and in the dry gas-cleaning process are also removed.

When cleaning roaster gas containing mercury, the main portion of mercury present in the roaster gas is taken up in the washing liquid by ensuring that the liquid contains at least 0.5 g/l mercury(II) ions. When treating sulfides containing relatively large quantities of arsenic, the removal of arsenic trioxide from the gas presents serious problems. When the process is effected under unfavourable operating conditions, deposits may be formed in different sections of the washing system. When pyrites and other iron-containing materials are treated, the roaster gas will include iron-containing dust, which is dissolved completely or partially in the washing-acid solution and when present in sufficient quantities, is precipitated out in the form of iron-sulfate together with arsenic trioxide and other impurities.

To avoid such disadvantages, arsenic present in the roaster gas is taken up in the washing stage suitable by ensuring that the washing liquid contains solid arsenic trioxide. In this respect it is particularly favourable for the washing liquid to contain more than 50 g/l arsenic trioxide in solid form. An empty tower in which roaster gas and washing liquid meet in countercurrent, has been found particularly favourable in this respect. The washing liquid is atomized in nozzles in the upper portion of the tower and is circulated over the tower in a quantity of the magnitude of 1 m³ liquid per 200–400 m³ roaster gas. In this case, newly precipitated materials deposit themselves, to a great extent, on crystals of arsenic trioxide present in the liquid, while the deposits on the walls of the apparatus, which otherwise present a serious problem in this context, are at a minimum. Solid arsenic trioxide when present in quantities of 50–100 g/l has been found to provide the desired seed-crystallizing effect.

Moreover, with such a tower it is possible to flush the walls of the tower and the gas inlet means continuously. The flushing liquid may comprise water, diluted washing acid solution or condensate, thereby reducing the risk of the formation of deposits still further.

When starting up a washing system, for example when the washing system has been closed down for a relatively long period of time, it is of the utmost importance that the given operation conditions are reached as soon as possible, since otherwise super saturated solutions are obtained and the excess substances precipitated out, these precipitates causing troublesome deposits on the walls of the tower, pipes, pumps and other apparatus components. To ensure that there is a sufficient amount of solid arsenic trioxide seed crystals in the system when starting the system up, the system is suitably provided with buffer tanks of such size that all the washing acid solution present, when the system is closed down, can be stored in the tanks. When the washing system is started up, the acid solution is returned to the washing system, so as to effectively protect the system against the possible precipitation of coatings from the time of starting up the system.

To ensure that iron sulfate ($FeSO_4 \cdot n\ H_2O$) and arsenic trioxide are precipitated uniformly, it should be seen that the concentration of sulfuric acid in the washing stage does not vary from the chosen content by more than 3%-units, and that said content is preferably held within the range of 40–70% by weight. The sulfuric acid content is suitably regulated by supplying to the system diluted sulfuric acid, for example, sulfuric acid obtained from another washing stage, in which sulfuric acid is used, and preferably in an unpurified state. In this way, the impurities are collected in a single washing liquid, from which they can be recovered more readily. Concentrated sulfuric acid may also be charged to the washing-acid circulation system, thereby to maintain the requisite sulfuric acid content at all points of the system. Diluted and/or concentrated sulfuric acid may be supplied from external sources, for example from other plants and washing systems, it being possible therewith to recover in a useable form any impurities which may be present in the acid supplied from such external sources.

The solid substance, which can be separated from the washing liquid by filtration for example, often contains such large quantities of constituents of no value as to render direct recovery of the valuable constituents impossible. Thus, when roasting arsenic-containing pyrite, the amount of iron sulfate formed in the washing system is often so large that the arsenic content of the filtered material is very low. As a result of the high sulfuric acid content of the washing liquid, a relatively large quantity of sulfuric acid will be removed together with the sludge, therewith rendering handling of the sludge difficult. This quantity of acid can be so large as to render it necessary to supply concentrated acid continuously to the system, in order to maintain the desired concentration of washing acid solution.

In order to be able to remove accumulated solid material from the washing liquid, and to be able to recover said material without encountering the aforementioned disadvantages, some of the circulating washing liquid containing i.a. solid arsenic trioxide is tapped-off into a part-stream which is passed through a filter, the filtrate being returned to the circulating washing liquid and the filtering material containing solid sulfates, arsenic trioxide and solid impurities of any mercury and selenium present in said part-stream, is treated by adding water thereto, which water dissolves the soluable sulfates. The solubilized sulfates are returned to the roasting process for decomposition or incineration and the solid residue is removed from the system. In order to avoid subjecting the filter to excessively large quantities of liquid, it may some times be necessary to thicken the part-stream of circulating washing liquid immediately upstream of the filter, the overflow from the thickener being combined to the filtrate and returned to the washing-liquid circulating system. Owing to differences in the solubilizing rate and the solubilizing conditions of metal sulfates and arsenic trioxide, when arsenic trioxide is present in the solid material separated from the washing liquid, the sulfates can be leached out to a substantial extent, wherewith the majority of the undissolved residue, which residue can be separated from the solution by filtration for example, will be arsenic trioxide and possibly present soluble mercury compounds, such as sulfides and selenides. By means of the described refining process, the arsenic trioxide content of sludge formed in the washing system when roasting pyrite, can be increased from 10-30% by weight up to 70-90% by weight or more, which means that the product can be further worked up directly, using known methods herefor. The solution obtained when refining sludge in accordance with the aforegoing contains a major proportion of the metal sulfates precipitated out in the washing stage and the sulfuric acid present in the filtered material from the first filter stage. This solution can not be released to the environment, because of the harmful effect it would have thereon, said solution in addition to containing heavy metals also containing a considerable amount of sulfur in the form of sulfuric acid and sulfates. It has been found possible, however, as described above, to return this solution to the roasting furnace, in which sulfides are roasted and in which the sulfates and sulfuric acid are split-off to a large extent, to form metal oxides, in the above case mostly iron oxides, and sulfur dioxide, wherewith the sulfur content of the solution is taken up in the roaster gas and can be recovered therefrom in a subsequent stage, for example in the form of sulfuric acid. The solution can be returned to the furnace without acid being accumulated in the system and in a manner such that the metals are taken up in the roasted products, which comprise mainly metal oxides and which are removed from the roasting stage, it being possible to recover the metals from said roasted products in a later stage.

After having passed the first cleaning stage, i.e. the washing stage, the roaster gas will have a certain water vapor content formed by cooling the gas by evaporation in the washing stage. The amount of water vapor formed in the roaster gas in this stage, however, may often be insufficient with the given choice of washing stage to ensure that substantially all the halogens accompanying the gas are dissolved in the condensate and bound therewith. Moistening of the gas to a water vapor content of at least 25 g/m$^3$, is achieved in a preferred embodiment in a particularly favourable manner by moistening the roaster gas down-stream of the washing stage in a separate moistening stage in which the gas is brought into contact with a liquid containing 20-40% by weight sulfuric acid at a temperature of 75°-35° C. The remaining impurities in the roaster gas are removed in the second washing stage, wherein it is ensured that the gas also obtains the high water-content required for the effective operation of the following cooling stages.

In order to control the concentration of sulfuric acid in the liquid and the amount of solid material accumulated therein, liquid is suitably passed from the moistening stage to the washing stage and diluted sulfuric acid or water is passed to the moistening stage so that the desired concentration can be maintained. In all stages where acid is circulated, the sulfuric acid concentration must be of such magnitude that the halogen content of the roaster gas is unable to accumulate in the washing acid solutions to critical levels. Gas which has passed the first cleaning stages, and is thus freed from dust and gaseous impurities (with the exception of halogens) is freed from entrained liquid-droplets suitable in cyclones or other types of liquid-droplet capturing apparatus, and is then cooled either by direct cooling techniques or indirect cooling techniques. A major portion of the water content of the gas is condensed out in this way. As a result of being treated in the preceding cleaning stage and in the liquid-droplet separator, the condensate will only contain insignificant quantities of sulfuric acid, arsenic etc., while, on the other hand, the whole of the halogen content is present in the condensate. The condensate is also saturated with sulfur dioxide. Despite its low impurity content the condensate cannot be discharged to a recipient without first being purified, because of its potential harmful effect on the environment.

Subsequent to being washed and possibly moistened, the gas is therefore suitably cooled indirectly and at least part of the condensate water is purified by precipitating from arsenic ions and heavy-metal ions taken up in the condensate in the form of halogenides and other water-soluble salts, whereafter the water is passed to a recipient and the remaining quantity of non-purified water is returned to the washing stage and/or the moistening stage. In this instance, it is suitable to purify the condensate water by adding a sulfide of an alkali or alkaline earth metal or is purified in an alkaline environment with an iron salt, such as iron sulfate. That part of the condensate which is to be purified, is suitably freed first from the major portion of its sulfur dioxide content, by stripping with air, which sulfur dioxide containing air can then be introduced into the flow of roaster gas. The condensate is then purified to the requisite degree. It has been found that precipitation with sulfides or alkalizing subsequent to adding iron salts provides a sufficiently low residual content of arsenic and mercury and also of other heavy metals. The pH of the solution must be brought to a suitable level, however, before releasing the solution to a recipient. The solution may also be used to moisten the roasted products.

The sludge obtained when purifying the condensate is separated from the solution in a known manner, for example by sedimentation followed by a final filtering process. The separated solid substances are returned to the process; it being possible to return the substances in a number of ways. For example, the bottom phase of the sediment can be introduced to the cycling system of the washing stage without further treatment, the impurities contained in said bottom phase being taken up in the sludge removed from the washing stage. The precipitated solid substances can also be charged to a roasting furnace or any other pyrometallurgical treatment apparatus, wherein arsenic and mercury, for example, are vaporised to slightly increase the content of these compounds in the roaster gases, from which they are separated, however, in the gas-cleaning stages. A combination of these possibilities can also be used.

The invention will now be described in more detail with reference to an example and with reference to the accompanying flow sheet.

750 tons of sulfuric acid were produced per day in a sulfuric acid plant in which arsenic-containing pyrite were roasted. On average the pyrite contained 0.2% As and further minor quantities of Hg, Se, etc. The pyrite was roasted in a reducing atmosphere, so that the iron oxides produced were mainly in the form of magnetite.

Subsequent to being cooled in a conventional waste-heat boiler and subjected to a dry gas-cleaning process in a hot electrical precipitator the gases were charged to an empty washing tower at a temperature of approximately 300° C., in which tower the gases were contacted in counter current with a circulating washing acid solution having approximately 50–55% by weight sulfuric acid, the washing acid solution being atomized in nozzles arranged in the upper portion of the tower. By evaporating water from the acid, the temperature of the gas was lowered to approximately 80° C. The arsenic content of the gas was taken up by the washing liquid precipitated out as arsenic trioxide and the major portion thereof being precipitated on ready-formed crystals slurried in the acid solution in a quantity of approximately 100 g/l.

Minor quantities of iron oxide dust passing through the dry gas-cleaning apparatus were also captured by the washing liquid. The dust is dissolved to a large extent to form iron sulfate, which is precipitated out in solid form. Diluted washing acid solution containing arsenic and iron sulfate in dissolved form and obtained from an other plant was also charged to the washing system. When evaporating this acid solution in the washing tower, the arsenic and iron sulfate thus supplied was also precipitated out in solid form on the slurried seed crystals.

The walls and gas-inlet of the tower were flushed with dilute washing acid and condensate, to prevent the formation of coatings thereon.

A part-stream of washing liquid with slurried solid phase was transferred to a thickener, from which acid is returned from an overflow to the washing-acid circulating system while the thickened underflow phase was filtered off. The filter cake, which comprises mainly iron sulfate and arsenic trioxide, also contains significant quantities of sulfuric acid and minor quantities of mercury, inter alia, in the form of HgSe. The amount of iron sulfate was so large that the arsenic trioxide content of the filter cake (ignoring the sulfuric acid content) was 10–30% by weight, which is so low as to render it impossible to recover arsenic trioxide by conventional methods.

Consequently, the filter cake was slurried in water, wherewith the major proportion of the iron sulfate and sulfuric acid was dissolved while a large percentage of the arsenic trioxide remained in solid form.

Subsequent to filtering, there was obtained a filter cake having 70–90% by weight arsenic trioxide and minor quantities of iron sulfate, sulfuric acid and mercurial compounds, arsenic trioxide, mercury and selenium could be recovered directly from the filter cake. The filtrate containing 10–15% by weight $H_2SO_4$ and the dissolved iron sulfate was injected into the roasting furnace, in which sulfuric acid and sulfate are decomposed to sulfur dioxide while the iron is converted to iron oxide and is removed as such from the furnace. The dissolved arsenic was driven off in the furnace in gas form. The roaster gases were transferred from the first washing tower to a second washing stage, which is also referred to as a moistening stage, in which the gases were washed with approximately 30% by weight sulfuric acid in a venturi scrubber at approximately 65° C. The remainder of the impurities in the gases were removed in the venturi scrubber. Acid solution containing these impurities in dissolved form was transferred to the first washing stage, in which the impurities were recovered.

In both of these washing stages, the sulfuric acid content was of such magnitude that the contents of chlorine and fluorine (in the form of chloride and fluoride) could be kept sufficiently low to prevent material damage to the apparatus. Maximum limit values of 3 g/l Cl and 1.5 g/l F of acid solution could be maintained without difficulty.

Subsequent to the two washing stages, any droplets of sulfuric acid in the gas were removed therefrom in a droplet separator, whereafter the gas was cooled indirectly in two stages, wherewith a large percentage of the water contained in the gas was condensed out. This condensate contained chlorides and fluorides and minor quantities of sulfuric acid ($\approx 0.5\%$ by weight $H_2SO_4$), arsenic and mercury.

To prevent halogens from accumulating in the system, approximately 75 m³ condensate was removed each day to a purification plant. Arsenic and mercury were precipitated out in this purification plan by adding sodium sulfide solution. The precipitate thus formed was flocculated by adding a flocculating agent, and was allowed to settle in a lamella sedimentation apparatus. The clarified solution obtained by said sedimentation was passed through a filter, in which any residual precipitates were removed, whereafter the solution was neutralized with sodium hydroxide and was discharged to a recipient or was used to moisten the iron oxides obtained when roasting the pyrite.

The bottom phase from the lamella sedimentation apparatus, was transferred, without further enrichment of the sludge phase, to the washing-liquid circulation system in the first washing stage. The precipitated impurities were thus incorporated in the arsenic-containing sludge, which was separated from the washing acid solution in this stage.

Surplus condensate from the two cooling stages was charged to the circulating systems of respective washing stages.

Thus there was produced by the process a pure sulfur dioxide containing roaster gas which was used for the manufacture of sulfuric acid, iron oxide having an arsenic content of 0.05%, a useable arsenic product containing 70–90% by weight arsenic trioxide containing the major proportion of the mercury and selenium contents of the concentrate, and a purified condensate containing halogens.

The method according to the invention enables; the gas-cleaning system to be constantly operated at maximum effect, valuable constituents to be removed in a form which enables them to be further treated directly, impurities of no value to leave the system in a form which is not objectionable from the aspect of environmental care. This combination of cleaning and recovering methods is dependent upon the availability of a roasting or smelting furnace in which certain materials can be incinerated, and consequently cannot be applied with the same minimum effect on the environment when such furnaces are not available.

We claim:

1. A method of wet-cleaning gases containing sulfur dioxide, halogens, and at least one volatilized substance selected from the group consisting of arsenic and arsenic compounds emanating from pyrometallurgical treatment of sulfidic materials, comprising washing the gases with diluted sulfuric acid circulating in a closed circuit, substantially the whole amount of the volatilized substance or substances present being taken up and solidified in said diluted acid;

selectively separating said solidified substance or substances from a part-stream of said diluted sulfuric acid in said closed circuit;
   recycling the part-stream to the washing step and the pyrometallurgical treatment;

removing from the washed gases any entrained liquid sulfuric acid;

controlling the water content of the gases so as to permit a substantial water condensation to be obtained during the subsequent cooling, cooling the washed gases having controlled water content whereby halogen ions are substantially completely taken up in the formed condensate;

separating the condensate from the gases;

treating at least a part of the condensate with a precipitating agent so as to precipitate any residual amounts of arsenic compounds;

separating the precipitate from the remaining condensate and neutralizing and discharging said remaining condensate to a recipient.

2. A method according to claim 1, wherein any mercury present in the gases is substantially taken up in the washing stage by ensuring that said diluted sulfuric acid contains at least 0.5 g/l mercury(II)-ions.

3. A method according to claim 1, wherein said diluted sulfuric acid contains more than 50 g/l arsenic trioxide in solid form.

4. A method according to claim 1, wherein said solidified substances are partly separated from said diluted sulfuric acid, and withdrawn from the process and wherein any solid compounds other than said solidified substances which also are separated from said diluted sulfuric acid are returned to the pyrometallurgical treatment stage for decomposition or incineration.

5. A method according to claim 1, wherein the gases subsequent to washing, are moistened in a separate stage to a water vapor content of at least 25 $g/m^3$.

6. A method according to claim 1, wherein said condensate is removed after cooling the gas and partly recycled to the washing stage, and partly transferred to treatment with a precipitating agent and precipitation of residual arsenic compounds.

7. A method according to claim 1, wherein the gases are cooled subsequent to being moistened, and wherein at least part of the condensed water is freed, by precipitation and separation, from residual arsenic compounds, whereafter the water is discharged to recipient and wherein residual quantities of non-purified water are returned as make up water to the washing stage and the moistening stage.

8. A method according to claim 7, wherein the condensed water is purified by adding a sulfide of a metal selected from the group consisting of alkali metals and alkaline earth metals.

9. A method according to claim 7, wherein the condensed water is purified in an alkaline environment with an iron salt.

10. A method according to claim 1, wherein the sulfuric acid concentration of said diluted sulfuric acid is permitted to vary from the selected content at most 3%-units, and wherein the said content is preferably held within the range of 40–70% by weight.

11. A method according to claim 10, wherein said sulfuric acid content is controlled by supplying diluted sulfuric acid, from a washing stage of an external plant in which sulfuric acid is used, in a non-purified form.

* * * * *